United States Patent [19]
Dändliker et al.

[11] 3,806,251
[45] Apr. 23, 1974

[54] METHOD OF MEASURING SMALL OBJECTS

[75] Inventors: René Dändliker, Oberrohrdorf; Beat Ineichen, Remetschwil, both of Switzerland

[73] Assignee: BBC Brown Boveri & Company Limited, Baden, Switzerland

[22] Filed: July 5, 1972

[21] Appl. No.: 269,067

[30] Foreign Application Priority Data
July 17, 1971  Switzerland.................... 10555/71

[52] U.S. Cl................ 356/111, 356/109, 356/159, 250/219 TH
[51] Int. Cl............................................. G01b 9/02
[58] Field of Search.......... 356/106, 108, 111, 159, 356/160; 250/219 TH, 219 WD

[56] References Cited
UNITED STATES PATENTS
3,659,950  5/1972  Troll.................................. 356/108
3,447,874  6/1969  Back................................... 356/124

FOREIGN PATENTS OR APPLICATIONS
1,229,739  12/1966  Germany............................. 356/159

*Primary Examiner*—Ronald L. Wibert
*Assistant Examiner*—Conrad Clark
*Attorney, Agent, or Firm*—Oblon, Fisher, Spivak, McClelland & Maier

[57] ABSTRACT

A method of measuring small objects is disclosed, in which Fraunhofer diffraction patterns of the object being measured and a reference object are produced through illumination of both objects with coherent light. The radiation intensities of both diffraction patterns are then measured at the same point and compared with one another. The reference object is adjusted until the radiation intensities of both diffraction patterns at the measuring point are equal, and the adjustment of the reference object required to produce this equality then provides a measure of the difference between a selected dimension of the object being measured and a desired or theoretical value.

23 Claims, 5 Drawing Figures

METHOD OF MEASURING SMALL OBJECTS

BACKGROUND OF THE INVENTION

1. Field Of The Invention

The present invention relates generally to a method of measuring small objects using Fraunhofer diffraction patterns and more particularly to a method of measuring small objects in which the object being measured and a reference object are illuminated with coherent light, and the resulting Fraunhofer diffraction patterns are compared.

2. Description Of The Prior Art

It is well known (New Scientist, Dec. 17, 1970, 506) to measure fine wires and fibres in a contactless fashion by illuminating them with coherent radiation, in particular of the kind produced by lasers, and producing a Fraunhofer diffraction pattern (see for example Gerthsen, Physik, Springer-Verlag 1960, 6. Edition, pages 388 ff), which is subsequently scanned using a photoelectric element. The local position of the intensity maxima in the diffracted light in the pattern is dependent upon the dimensions of the object being measured, that is to say upon the dimension producing the diffraction, and any change in dimensions thus produces a change in the electrical output signal from the photoelectric element. Using this known measuring technique, considering fibres of about $10\mu$ diameter, an accuracy of around 1 percent and a maximum sensitivity of 0.2 percent have been achieved. In this context, the term "accuracy" is intended to signify the reproducibility of an absolute measured value, and the term "sensitivity" signifies the change in the measured quantity (e.g., the thickness of a fibre) produced by a perceptible change in the measured signal, which perceptible change is not, however, effectively quantitatively measurable.

In many cases, however, the accuracy of the known technique is inadequate. Consequently, a need exists for a technique which improves the accuracy of the known measuring method.

SUMMARY OF THE INVENTION

Accordingly, one object of this invention is to provide a novel method of measuring small objects which permits measurements of greater accuracy than were possible in the past.

Another object of this invention is to provide a novel method of measuring small objects using Fraunhofer diffraction patterns produced by substantially coherent light beams.

A still further object of the present invention is to provide a novel method of measuring the difference between a particular dimension of an object and a desired or theoretical value.

Briefly, these and other objects of the present invention are achieved by providing Fraunhofer diffraction patterns of the object being measured and also of a reference object through illumination of both objects with coherent light. By altering the physical or image dimensions of the reference object, the two Fraunhofer diffraction patterns can be made congruent with one another, or can be brought into positional alignment, at least with respect to the dimensions of interest of the object being measured. The radiation intensities of both diffraction patterns are then measured at the same point and compared with one another.

By this method, extremely high accuracy is obtained because of the fact that the reference object itself, or possibly its real or virtual image (produced by optical means), can be changed in size in a very precise fashion. Thus, the Fraunhofer diffraction pattern of the object being measured and of the reference object can be brought into precise alignment or coincidence, a condition which can readily be determined photoelectrically by the identity between the intensities of the two patterns at the same point of measurement. It is sufficient, of course, that the diffraction patterns be brought into coincidence exclusively in the direction of the dimensions being measured. For example, the object being measured may be a rectangular hole and the reference object a slit whose width is adjustable parallel to one side of the hole. In this case, coincidence between the diffraction patterns can be produced in a direction perpendicular to the slit direction so that the dimension of the hole perpendicular to the direction of the slit can then be measured.

Advantageously, the output signal from a photoelectric element may be used to change the relevant dimensions of the reference object. Using a control circuit, this change may be made so as to reduce to zero the difference between the intensities of the diffraction patterns at the point of measurement.

Advantageously, at the output of the photoelectric element an alternating signal is produced, according to the present invention, by virtue of the fact that, at the point of measurement, the intensities of the diffraction patterns of the object being measured and reference object are measured periodically in time and alternately. The amplitude of the alternating signal is then directly proportional to the difference between the intensities of the two diffraction patterns at the point of measurement, and the phase indicates whether the object being measured or the reference object is larger or smaller.

The production of a real or virtual image of the reference object by optical means is a further particular advantage if the object being measured does not have a simple form, for example where a circular hole is being measured. Then the production of a hole which can be mechanically varied in diameter in order to serve as the reference object is extremely difficult. This difficulty is overcome, however, by the fact that an image of a hole of substantially any diameter may be easily produced, and can be measurably enlarged or reduced simply by adjustment of a suitable optical system or apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
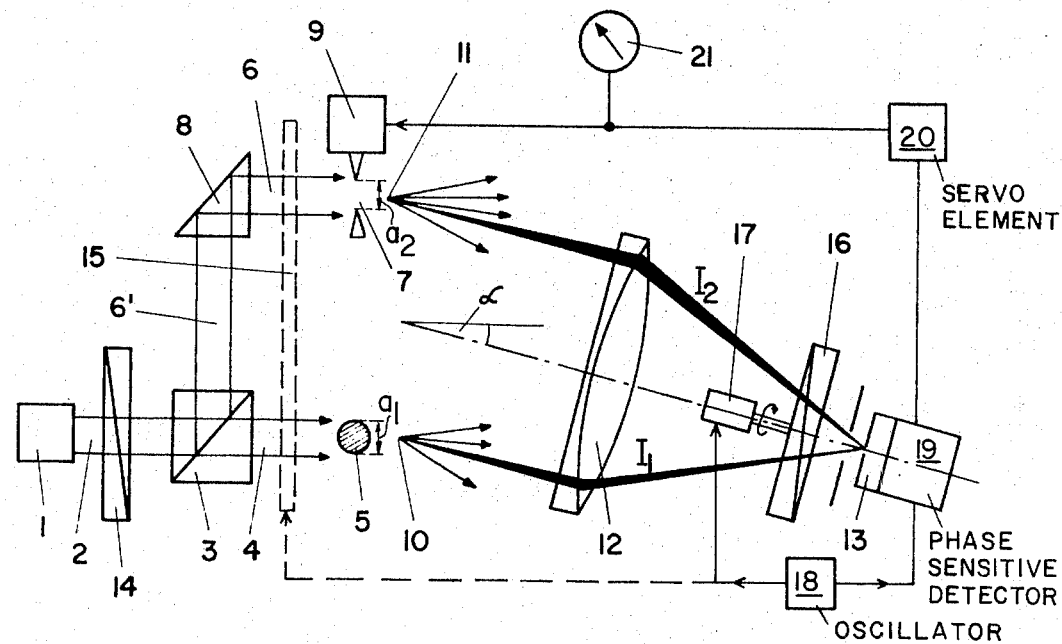
FIG. 1 illustrates an arrangement for implementing the method of the present invention.

Referring now to the drawings, wherein like reference numerals designate identical or corresponding parts throughout the several views, and more particularly to FIG. 1 thereof, a coherent radiation source 1 is shown, from which a parallel beam 2 emanates. This beam 2 is split in a splitter prism 3 into a beam 4 used to illuminate the object 5 being measured and into a beam 6' or 6 used to illuminate a reference object 7. The two split beams are made as nearly as possible equal in intensity. The beam 6 is produced by deflecting the beam 6' through a deflection prism 8. The beams 4 and 6 are inherently and mutually parallel. The object 5 being measured may, for example, be a wire having a circular cross sectional configuration, and the reference object 7 may be a slit oriented parallel to the wire or object 5. The slit can be varied in width mechanically, e.g., by screw means, and electrically, e.g., piezoelectrically. An electro-mechanical slit adjusting system is diagrammatically illustrated in FIG. 1 by a block 9.

The parallel beams 4 and 6 illuminating the object 5 being measured and the reference object 7, are diffracted in the conventional manner so that beams 10 and 11 are produced. These beams 10 and 11 are coordinated using a converging lens 12 in such a fashion that rays making an angle $\alpha$ with the direction of the beams 4 and 6, are collected at the focal point of the lens 12 where a photoelectric element 13 (e.g., a photo-multiplier or a photo-diode) is positioned.

Figure 2:
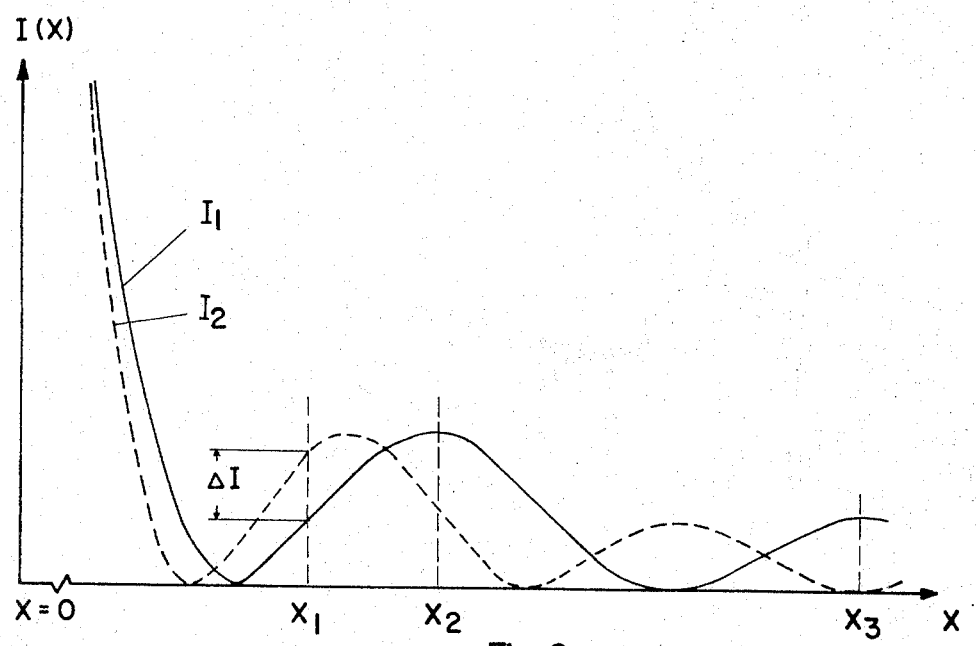
FIG. 2 illustrates the intensity distribution of the diffraction patterns of the object being measured and reference object in the plane of observation and in the direction of an object dimension being measured.

The rays of beams 10 and 11, focused onto the focal plane by the lens 12, each produce Fraunhofer diffraction paterns of intensities $I_1$, $I_2$, whose positional distribution in a direction $x$ in the focal plane, is illustrated in FIG. 2. In FIG. 2, $x$ is the distance from the point of maximum brightness ($x=0$) of the two diffraction patterns $I_1$ and $I_2$. This location would be illustrated in FIG. 1 by the intersection of a straight line of inclination $\alpha = 0$ through the optical center of the lens 12, and the focal plane thereof. The direction $x$ is perpendicular to the direction of the wire serving as the object 5 being measured, and is arranged to pass through the focal point of the lens 12, that is to say in the direction of the wire dimension being measured (i.e., the wire thickness).

As shown in FIG. 2, and as those skilled in the art of optics will appreciate, the Fraunhofer diffraction patterns $I_1$ and $I_2$ exhibit maxima and zeros. These are at different values of $x$ in the cases of $I_1$ and $I_2$, as long as the compared dimensions of the object 5 being measured and reference object 7, namely the wire thickness $a_1$ and the slit width $a_2$, differ by a finite value $\Delta a$. Theory tells us that at a particular location $x_1$, for example, the difference $\Delta I$ between the intensities of the two diffraction patterns, is proportional to the value $\Delta a$, so that:

$$\Delta I = I_2 - I_1 = K \cdot \Delta a.$$

By measuring $\Delta I$ with the help of the photoelectric element 13 of FIG. 1, a measure is obtained of the deviation of the dimension $a_1$ of the object 5 being measured from its theoretical value, represented by the comparable dimension $a_2$ of the reference object 7.

Figure 3:
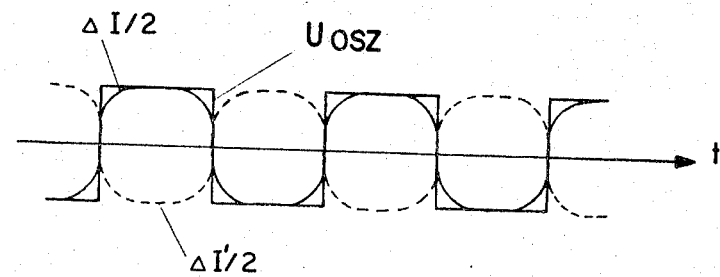
FIG. 3 illustrates alternating signals at the output of the photoelectric element together with a reference signal.

The measurement of the value $\Delta I$ is effected, in the example under consideration, by virtue of the fact that at the point of measurement $x_1$ both the intensity $I_1 (x_1)$ and the intensity $I_2 (x_1$ are measured periodically and alternately. Thus, at the output of the photoelectric element 13 an alternating signal of amplitude $\Delta I/2$ is obtained, and this is shown in FIG. 3.

The alternate measurement of $I_1 (x_1)$ and $I_2 (x_1)$ by alternate application of these intensities to the photoelectric element 13 can be effected in different ways. For example, the beam splitter 3 may be a polarizing splitter prism, so that the beam 2 leaving the coherent radiation source 1 and linearly polarized by means of a polarizer 14, is split up into beams 4 and 6 polarized linearly and at right angles to one another. Beyond the beam splitter 3, e.g., beyond the lens 12, a second polarizer 16 is then arranged in the ray path of both beams 10 and 11. This polarizer 16 is rotated by a drive 17 in such a fashion that for each timing pulse from an oscillator 18 the polarizer 16 is indexed through an angle $\pi/2$. Consequently, at any one time either the beam 10 exclusively, or the beam 11 exclusively, is applied to the photoelectric element 13. Consequently there appears at the output of the element 13 a substantially square wave electrical alternating signal as shown in FIG. 3 and designated $\Delta I/2$. By rotating the polarizer 14, the intensities of the beams 4 and 6 may be altered oppositely in relation to one another.

Instead of positioning the second polarizer 16 beyond the lens 12, it may also be positioned in front of the lens 12, at the position occupied by a dashed box 15, for example. In this case, the second polarizer is located in the ray paths of beams 4 and 6.

Instead of polarizers 14 and 16 and a splitter prism 3 in the form of a polarizing prism, it is equally satisfactory to utilize a rotating diaphragm positioned at the location of the dashed box 15, or of the polarizer 16. Such a rotating diaphragm would contain apertures so disposed that the beams 10 and 11 are alternately permitted to fall upon the photoelectric element 13.

A final alternative, which is particularly advantageous in the context of high frequency outputs from the photoelectric element 13, again includes the splitter prism 3, designed as an element which linearly polarizes the beams 4 and 6 at right angles to one another and, for intensity control, the polarizer 14 is also again provided. However, an electro-optical modulator is provided in either the beams 4 and 6 or the beams 10 and 11. For example, a Pockels cell with ensuing polarizer may be employed as an electro-optical modulator of this type, as is well known in the art (e.g., from Sci. Am. June 1968, page 18). The electro-optical modulator may be located in the position occupied by the dashed box in FIG. 1.

The electro-optical modulator (or alternatively the drive 17 for a rotating polarizer 16 or the rotating diaphragm) is controlled by a voltage $U_{osz}$ from the oscillator 18. Then an alternating signal is obtained at the output of the photoelectric element 13, having a wave form $\Delta I/2$ as shown in graphical form in FIG. 3.

The output of the photoelectric element 13 is coupled to a phase-sensitive detector 19 into which the voltage $U_{osz}$ from the oscillator 18 is fed as a phase reference. In the detector 19, an error signal is generated which is proportional to the amplitude $\Delta I/2$ of the alternating signal from the photoelectric element 13. The polarity of this error signal depends upon the phase of the alternating signal in relation to the reference signal from the oscillator. It is possible in this way to detect whether $I_2 > I_1$ or $I_1 > I_2$ applies at the point of measurement $x_1$. If $I_1 > I_2$, a signal $\Delta I'/2$ (see FIG. 3) is obtained, for example.

The error signal produced in the detector 19, which is proportional to the intensity difference $\Delta I$, is preferably fed to a servo element 20 whose direct output voltage is applied to a piezoelectric element in block 9, through which the width of the slit 7 is altered. A direct voltage of 100 V, for example, produces an elongation of the piezoelectric element by one micron. Control is effected in such a manner that the slit width is altered until $\Delta I = 0$. This is possible because with alteration of the slit width in the direction of the value of the wire or object dimension being measured, the diffraction pattern $I_2(x)$ of the beam 11 in the direction $x$ can be displaced until coincidence with $I_1(x)$ is obtained. The direct voltage required to operate the piezoelectric element in the block 9 in order to make $\Delta I = 0$, can be read off on a measuring instrument 21. This voltage is proportional to, and has the same sign as, the abovedefined quantity:

$$\Delta a = a_2 - a_1.$$

Theory states that maximum measurement sensitivity is achieved when the photoelectric element 13 is placed at a location $x_1$ for which the following condition applies:

$$x_1 = (2n + 1)f_1 \cdot \lambda/4a_1$$

where $n$ is a whole number, $f_1$ is the focal length of the lens 12, $\lambda$ is the wavelength of the monochromatic light used, and $a_1$ is the thickness of the wire or object 5. For a value of $x_1$ chosen in this way, the proportionality constant K in the formula set forth above is at a maximum. We then have the following expression for the relative sensitivity:

$$\Delta I/I = [(2n + 1)/4] \cdot \Delta a/a_1.$$

The angle $\alpha$ of the lens 12 in FIG. 1 is chosen so that the focal point of the lens, and therefore the location of the light-sensitive part of the photoelectric element 13, is located at $x_1$. Reproduction of the brightness peak $x = 0$, or resolution of the slit 7, is not necessary.

Instead of using a wire as the object 5 being measured and a slit as the reference object 7, in accordance with the Babinet theorem (see Bergmann-Schaeffer, "Lehrbuch der Experimentalphysik," 2nd Edition, Volume III, 1st chapter, page 275), it is possible, for example, to use holes, slotted diaphragms and the like in place of the wire, and compare them with slits or other variable apertures.

Figure 4:
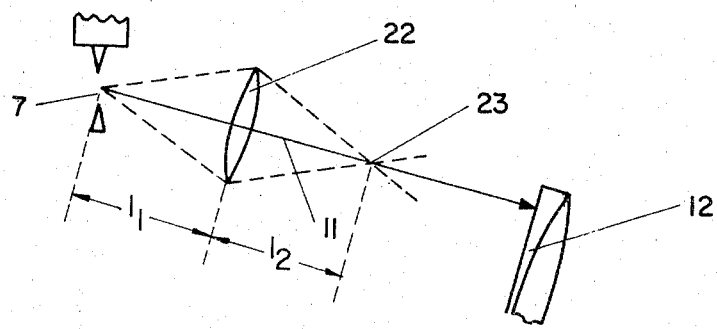
FIG. 4 illustrates optical means for generating a real image of the reference object which image is variable in size; and, FIG. 5 is a variant embodiment of the arrangement shown in FIG. 1 for eliminating the noise component from the light source.

However, difficulties are encountered if the reference object, because of its form, cannot be easily mechanically modified so as to bring its Fraunhofer diffraction pattern into alignment with the Fraunhofer diffraction pattern of the object being measured. This is the case, for example, where a circular aperture is to be measured and the reference object is a similar aperture or corresponding disc. Then, in accordance with an advantageous further development of the present invention as shown in FIG. 4, a converging lens 22, of focal length $f_2$, is arranged in the path of beam 11. The lens 22 produces a real image with a magnification of about 1 : 1 at 23, of the opening of diameter $a_2$ which represents the reference object 7. The distance $l_1$ of the lens 22 from the opening at 7, is:

$$l_1 = 2f_2 + \epsilon.$$

Similarly, the distance $l_2$ of the image at 23 from the lens 22 is:

$$l_2 = 2f_2 - \epsilon.$$

By displacing the lens 22 along its optical axis and thus by altering the value $\epsilon$, the image 23 of the aperture 7 can be enlarged or reduced until the diffraction patterns $I_1$ and $I_2$ coincide and the detector 19 measures $$\Delta I = 0.$$

By determining the value $\epsilon$ of the lens displacement, e.g., by measuring the voltage which is required for electro-mechanical movement of the lens 22, it is again possible to determine the measured quantity $\Delta a$ from the relation:

$$\Delta a = a_2/f_2 \cdot \epsilon = K' \cdot \epsilon$$

If the intensities of the beams 4 and 6, or 10 and 11 are not strictly identical to one another, the diffraction patterns $I_1(x)$ and $I_2(x)$ cannot be brought fully into alignment. In the determination of changes in thickness of the type hereinbefore described, this, broadly speaking, causes no problem. However, it does cause a problem in situations where particularly stringent requirements are imposed upon the accuracy of the measurement, or where absolute measurements are to be carried out, i.e., where the true (absolute) size of the measured object is to be determined from the match size of the reference object. In order to avoid intensity differences, a second light detector can be provided at the location $x_2$ of an intensity maximum in the diffraction pattern $I_1(x)$ of the object being measured. After the detector at $x_1$ has been matched to $\Delta I = 0$, by altering the relevant physical or image dimensions of the reference object 7, the intensities of the beams 4 and 6 or 10 and 11 are varied in relation to one another by rotating the polarizer 14, for example, until $\Delta I = 0$ is measured at $x_2$. However, the second detector can equally well be used to measure the integral intensity in each case of one pattern, over several diffraction peaks, e.g. for $x_1 \leq x \leq x_3$, and the intensity can be adjusted until the measured integral intensities are identical to one another.

A helium-neon laser can be used as the coherent radiation source 1, for example. Then, the relevant dimension $a_1$ of objects can be measured in the range from 10 to 500 $\mu$ to an accuracy of around 1 percent. For larger values of the dimension $a_1$, a $CO_2$ laser, which has a longer wavelength than the helium-neon laser, can be used. If the wavelength is too short with respect to the quantity $a_1$, the above-defined optimum $x_1$ would be situated too close to the brightness peak at $x = 0$ so that resolution with the photoelectric element would be a problem.

Instead of the laser, however, other radiation sources which are non-coherent or have poor coherency, but which have adequate spectral light density, could be used. For example, laser diodes, luminescent diodes and spectral lamps could be used. The positional coherency of the beams 4 and 6 can then be achieved by known methods, e.g., using slits which are sufficiently narrow, while the spectral width can be restricted by the use of colored filters for example, to a few percent of the wavelength. Then, naturally enough, an intensity loss has to be accepted. The beams 4 and 6 need not be mutually coherent because they are not being made to interfere with one another and instead are measured separately and alternately.

The illustrated arrangement is essentially insensitive to lateral displacements, i.e., changes in the distance between object 5 being measured and reference object 7.

Through the inclined disposition of the lens 12, it is possible to use cheap lenses of small apertural angle. Resolution of the slit 7 is not necessary in accordance with the apparatus of the present invention.

The alternating application of the beams 10 or 11 to the photo-electric element 13 can also be achieved by employing as the radiation source 1 a gas laser exhibiting Zeeman splitting [Philips Technical Review No. 30 (1969/70) No. 6, 7,, pages 165–170], which supplies a linearly polarized light wave rotating at an angualr velocity which is dependent upon the applied magnetic field. If the splitter prism 3 is then designed as one which produces linear, orthogonal polarization, then the beams 10 and 11 are passed alternately, one at a time, to the photo-electric element 13, the frequency of the alternating signal being twice the rotation frequency of the laser wave.

Figure 5:
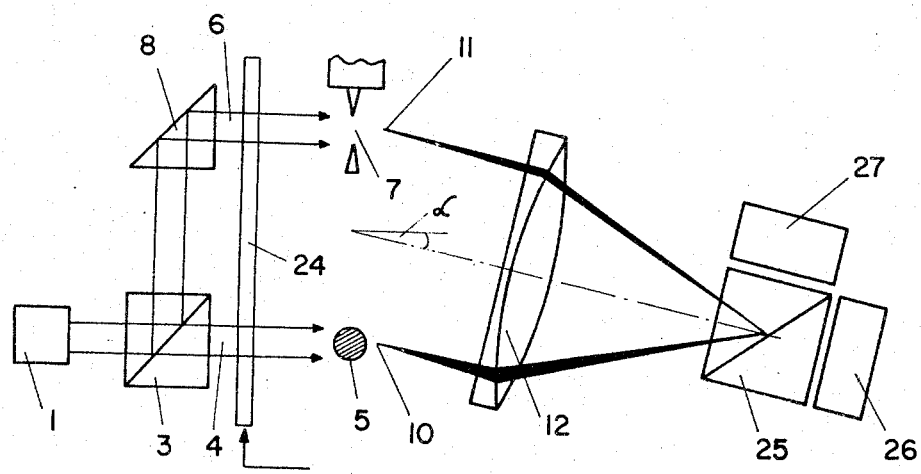

In order to eliminate the noise component of the radiation source 1, an arrangement of the kind shown in FIG. 5 can be used. The radiation from the source 1 is split in a normal splitter prism 3, which does not introduce any polarization. The split beams 4 and 6 then each pass through one of a pair of rotating linear polarizers, indicated by a block 24. The directions of polarization of these two linear polarizers are staggered by $\pi/2$ radians in relation to one another, and they rotate at the same radian frequency. The beams 4 and 6 are thus in all cases polarized linearly at right angles to one another but change their directions of polarization periodically. The beams 10 and 11 behave in a corresponding manner. The lens 12 focuses the rays of the beams 10 and 11 in its focal plane. At that point, an orthogonally polarized beam splitter 25 is provided, through which a modulated difference signal is generated in each of a pair of photo-detectors 26 and 27, one being in antiphase with respect to the other. In the photo-detector 26, therefore, the signal $I_o - \Delta I \cos\Omega t$ is produced, and in the photo-detector 27 the signal $I_o + \Delta I \cos \Omega t$ is produced, wherein:

$$I_o = (I_1 + I_2) 2,$$

$$\Delta I = I_2 - I_1$$

and $\Omega$ is twice the radian frequency of the rotating polarizers 24. The signals are then subtracted electronically from one another in a manner which has not been illustrated since it is well known per se. Consequently, the quantity $I_o$, and therefore the noise component common to the two signals, is elminated and only the effective signal is left.

Instead of the rotating polarizers 24, a suitable electro-optical modulator can be provided, e.g. a $\pm \lambda/4$ modulator with an additional $\lambda/4$ plate if the beam splitter 3 is also designed to produce orthogonal polarization.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of measuring small objects comprising the steps of:
    illuminating both an object to be measured and a reference object with coherent radiation, said step of illuminating including the step of irradiating said object to be measured and said reference object with separate, mutually parallel beams emanating from the same coherent source;
    focusing light emanating from said irradiated objects on a photoelectric element after said objects have been irradiated by said separate, mutually parallel beams to form separate superimposed Fraunhofer diffraction patterns of both said objects;
    measuring the radiation intensities of both said Fraunhofer diffraction patterns at a position a predetermined distance from a diffraction maximum of said object to be measured; and,
    comparing said radiation intensities detected in said step of measuring.

2. A method of measuring small objects as in claim 1, further comprising:
    the step of altering the physical dimensions of said reference object.

3. A method of measuring small objects as in claim 1, further comprising:
    the steps of creating an image of said reference object.

4. A method of measuring small objects as in claim 1, wherein:
    said step of measuring is carried out such that the radiation intensities of both of said Fraunhofer diffraction patterns are measured separately, periodically and alternately; and where
    said step of measuring includes the step of generating an alternating output signal having an amplitude equal to one half the intensity difference between said Fraunhofer diffraction patterns.

5. A method of measuring small objects as in claim 4, wherein:
    said step of measuring further includes the steps of utilizing the amplitude of said alternating output signal as an indication of the magnitude of the deviation of at least one dimension of said object to be measured from a dimension of said reference object; and,
    utilizing the phase of said alternating output signal as an indication of the sign of said deviation.

6. A method of measuring small objects as in claim 1, further comprising the step of:
    selecting said object to be measured and said reference object such that they are complementary to one another in the sense of the Babinet theorem.

7. A method of measuring small objects as in claim 1, wherein:
    said step of focusing includes the step of positioning a converging lens in the path of said separate, mutually parallel beams such that said converging lens is inclined at a finite angle with respect to said beam paths.

8. A method of measuring small objects as in claim 1, wherein:
said step of illuminating includes the step of developing said separate, mutually parallel beams by positioning a beam splitting prism in the path of the output beam from said coherent source.

9. A method of measuring small objects as in claim 1, further comprising the step of:
choosing the distance of said point at which said radiation intensities are measured from the location of maximum brightness of said diffraction patterns so that said distance is equal to $$(2n + 1) f_1 \cdot \lambda/4a_1,$$

where $n$ is a whole number, $f_1$ is the focal length of the convergent lens, $\lambda$ is the wavelength of the illuminating radiation and $a_1$ is the dimension of the object being measured.

10. A method of measuring small objects as in claim 8, further comprising the step of:
periodically and alternately interrupting said separate and mutually parallel beams.

11. A method of measuring small objects as in claim 8, further comprising the steps of:
linearly and orthogonally polarizing said separate, mutually parallel beams; and,
periodically and alternately blocking said beams using further polarization.

12. A method of measuring small objects as in claim 11, wherein:
said step of linearly and orthogonally polarizing beams includes the step of placing a polarizing splitter prism in the path of both beams; and wherein,
said step of periodically and alternately blocking said beams using further polarization includes the step of placing an electro-optical modulator having ensuing polarization in the path of said beams.

13. A method of measuring small objects as in claim 11, wherein:
said step of linearly and orthogonally polarizing said separate, mutually parallel beams includes the step of placing a polarizing splitter prism in the paths of both beams; and wherein,
said step of periodically and alternately blocking said beams using further polarization includes the step of rotating a polarizer positioned in the path of said beams.

14. A method of measuring small objects as in claim 4, further comprising the steps of:
converting said coherent radiation into a linearly polarized wave; and,
subsequently splitting said coherent radiation into two separate, mutually parallel beams.

15. A method of measuring small objects as in claim 14, further comprising the step of:
rotating the direction of polarization of said linearly polarized wave by using a gas laser exhibiting Zeeman splitting.

16. A method of measuring small objects as in claim 1, further comprising the steps of:
utilizing a diaphragm having an adjustable slit therein as said reference object; and,
electro-mechanically adjusting said slit.

17. A method of measuring small objects as in claim 16, further comprising the step of:
adjusting the width of said slit in response to differences in intensity detected in said step of measuring between said Fraunhofer diffraction patterns.

18. A method of measuring small objects as in claim 17, further comprising the step of:
displaying a quantity proportional to said slit width adjustment as a measure of the deviation of the dimensions of said object being measured from those of said reference object.

19. A method of measuring small objects as in claim 1, further comprising the steps of:
producing an image of said reference object by optical means; and,
comparing the diffraction pattern of said image with that of said object to be measured.

20. A method of measuring small objects as in claim 19, further comprising the step of:
varying the size of said image until the radiation intensities of said diffraction patterns determined in said step of measuring are equal.

21. A method of measuring small objects as in claim 19, further comprising the step of:
varying the dimensions of said reference object until the difference between the intensities of said diffraction patterns is reduced to zero.

22. A method of measuring small objects as in claim 1 further comprising the step of:
producing said coherent radiation using a helium-neon laser if said object to be measured is relatively small or using a $CO_2$ laser if said object to be measured is larger.

23. A method of measuring small objects as in claim 1, further comprising the steps of:
utilizing separate beams of coherent radiation to illuminate said object to be measured and said reference object,
linearly polarizing said beams at right angles with respect to one another,
periodically changing the direction of polarization of said beams,
focusing said beams after they have passed the object to be measured and the reference object using a converging lens,
splitting the focused beams into two separate beams polarized at right angles with respect to one another,
converting said split beams into electrical signal; and,
electronically subtracting said electrical signals from one another.

* * * * *

UNITED STATES PATENT OFFICE
CERTIFICATE OF CORRECTION

Patent No. 3,806,251     Dated April 23, 1974

Inventor(s) Rene Dandliker et al.

It is certified that error appears in the above-identified patent and that said Letters Patent are hereby corrected as shown below:

Column 3, line 41, "paterns" should read -- patterns --. Column 4, line 58, after "box" insert -- 15 --.

Signed and sealed this 29th day of October 1974.

(SEAL)
Attest:

McCOY M. GIBSON JR.
Attesting Officer

C. MARSHALL DANN
Commissioner of Patents